(12) United States Patent
Reingold

(10) Patent No.: US 8,976,887 B2
(45) Date of Patent: Mar. 10, 2015

(54) PHASE NOISE ESTIMATION FOR MIMO COMMUNICATION

(71) Applicant: Broadcom Corporation, Irvine, CA (US)

(72) Inventor: Ilan Reingold, Givataim, IL (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/918,438

(22) Filed: Jun. 14, 2013

(65) Prior Publication Data

US 2014/0286463 A1 Sep. 25, 2014

Related U.S. Application Data

(60) Provisional application No. 61/803,270, filed on Mar. 19, 2013.

(51) Int. Cl.
*H04B 7/02* (2006.01)
*H04B 7/04* (2006.01)
*H04B 7/06* (2006.01)

(52) U.S. Cl.
CPC ............ *H04B 7/0413* (2013.01); *H04B 7/0456* (2013.01); *H04B 7/0617* (2013.01)
USPC ........... 375/267; 375/260; 375/259; 375/295; 375/316; 375/219

(58) Field of Classification Search
CPC ............... H04B 7/0413; H04B 7/0617; H04B 17/0042; H04B 7/0456; H04L 2027/0067
USPC .................. 375/267, 260, 259, 295, 316, 219
See application file for complete search history.

(56) References Cited

U.S. PATENT DOCUMENTS

| 2005/0047384 | A1* | 3/2005 | Wax et al. ...................... 370/338 |
| 2007/0099571 | A1* | 5/2007 | Withers et al. ............. 455/67.11 |
| 2010/0093282 | A1* | 4/2010 | Martikkala et al. .......... 455/63.4 |
| 2011/0195670 | A1* | 8/2011 | Dakshinamurthy et al. ..... 455/73 |
| 2011/0205913 | A1* | 8/2011 | Van Zelst et al. ............. 370/252 |
| 2012/0270507 | A1* | 10/2012 | Qin et al. ......................... 455/73 |
| 2013/0114752 | A1* | 5/2013 | Murakami et al. ............ 375/267 |

* cited by examiner

*Primary Examiner* — Kenneth Lam
(74) *Attorney, Agent, or Firm* — Sterne, Kessler, Goldstein & Fox P.L.L.C.

(57) ABSTRACT

The system and method of the present disclosure exploit the fact that an undesired phase offset between signals up-converted and transmitted by transmitters of at least two transceivers is correlative with a phase offset between signals received and down-converted by receivers of the at least two transceivers. Such correlation occurs when the transmitter and receiver in each of the at least two transceivers share the same local oscillator and thus experience the same or very similar random phase noise. Using this fact, the system and method of the present disclosure are configured to measure the phase offset between signals received and down-converted by the receivers of the at least two transceivers and then use the measured phase offset to compensate for the phase offset between the signals up-converted by the transmitters of the at least two transceivers. This compensation allows MIMO communication, such as spatial multiplexing, to be better performed.

24 Claims, 3 Drawing Sheets

PHASE NOISE ESTIMATION FOR MIMO COMMUNICATION

CROSS REFERENCE TO RELATED APPLICATIONS

This application claims the benefit of U.S. Provisional Patent Application No. 61/803,270, filed Mar. 19, 2013, which is incorporated herein by reference.

TECHNICAL FIELD

This application relates generally to multiple-input multiple-output (MIMO) communication and, more specifically, to phase noise estimation for MIMO communication.

BACKGROUND

Multi-antenna techniques are used in communication systems to improve performance. These techniques rely on multiple antennas at the transmitter and/or receiver and can be grouped into three different categories: diversity, beamforming, and spatial multiplexing. These three categories are often collectively referred to as MIMO communication.

To provide a specific example of MIMO communication, consider the wireless communication system 100 shown in FIG. 1 that includes a transmitter 102 with two transmit antennas 104-1 and 104-2 and a receiver 106 with two receive antennas 108-1 and 108-2. Spatial separation between the two antennas at both the transmitter 102 and the receiver 106 create different sub-channels, each including different signal paths and signal path lengths, across the wireless channel 110. For example, the signal path length of the sub-channel between the transmit antenna 104-1 to the receive antenna 108-1 is different from the signal path length of the sub-channel between the same transmit antenna 104-1 to the receive antenna 108-2. Because of these differences in signal path lengths (and for other differences in the sub-channels), a signal transmitted from either one of the transmit antennas 104-1 and 104-2 will arrive at the receive antennas 108-1 and 108-2 with different phase shifts. These different phase shifts can be respectively represented by the channel elements $h_{11}$, $h_{12}$, $h_{21}$, and $h_{22}$ as shown in FIG. 1, or by the channel matrix H given by:

$$H = \begin{pmatrix} h_{11} & h_{21} \\ h_{12} & h_{22} \end{pmatrix} \quad (1)$$

Assuming knowledge about the channel matrix H can be determined and that the channel matrix H is invertible, it is possible to transmit different signals from the transmit antennas 104-1 and 104-2 in parallel and separate the different signals at the receiver 106 using the MIMO communication technique of spatial multiplexing. For example, as further shown in FIG. 1, the two transmit antennas 104-1 and 104-2 can respectively transmit, in parallel, two different signals $s_1$ and $s_2$. The resulting signals $r_1$ and $r_2$ respectively received by the receive antennas 108-1 and 108-2 can be expressed as:

$$\bar{r} = \begin{pmatrix} r_1 \\ r_2 \end{pmatrix} = \begin{pmatrix} h_{11} & h_{21} \\ h_{12} & h_{22} \end{pmatrix} \cdot \begin{pmatrix} s_1 \\ s_2 \end{pmatrix} + \begin{pmatrix} n_1 \\ n_2 \end{pmatrix} = H \cdot \bar{s} + \bar{n} \quad (2)$$

where $\bar{n}$ is a vector consisting of noise elements $n_1$ and $n_2$ that impair the signals received at the different receive antennas 108-1 and 108-2. The transmitted signals $s_1$ and $s_2$ can be recovered at the receiver 106 with no interference between the signals by multiplying the received vector $\bar{r}$ by the inverse of the channel matrix H.

The above represents one method for performing spatial multiplexing. Other methods include, for example, using a linear precoder at the transmitter to effectively "orthogonalize" the parallel transmissions from the transmitter 102. Specifically, the channel matrix H (or some estimate of the channel matrix H) can first be expressed as its singular-value decomposition (SVD):

$$H = U \cdot \Sigma \cdot V^* \quad (3)$$

where U is an $N_{RX}$ by $N_{TX}$ unitary matrix, $\Sigma$ is an $N_{TX}$ by $N_{TX}$ diagonal matrix, V is an $N_{TX}$ by $N_{TX}$ unitary matrix, and $N_{RX}$ and $N_{TX}$ respectively represent the number of antennas at the receiver and transmitter. After expressing the channel matrix H as its SVD, the matrix V can be applied at the transmitter by the linear precoder and U* can be applied at the receiver, leaving an equivalent channel matrix equal to the matrix a Because the matrix $\Sigma$ is diagonal, the spatially multiplexed signals are effectively "orthogonalized" and do not interfere at the receiver.

In general, accurate knowledge of the channel matrix H is essential to reducing residual interference between signals $s_1$ and $s_2$ transmitted in parallel over the channel using any method of spatial multiplexing. However, even with perfect knowledge of the channel matrix H, inherent sources of phase noise present in the transmitter 102 and the receiver 106 will result in residual interference between the signals $s_1$ and $s_2$ at the receiver. In particular, local oscillator signals used to up-convert the signals $s_1$ and $s_2$ at the transmitter 102 for transmission and down-convert the signals $r_1$ and $r_2$ for demodulation at the receiver 106 include phase noise. The spectrum of an ideal local oscillator signal assumes the shape of an impulse. In practice, however, phase noise is seen in the spectrum of a local oscillator signal as random fluctuations or "skirting" around the impulse. If not accounted for, this phase noise can corrupt the resulting up-converted or down-converted signals and result in residual interference between the signals $s_1$ and $s_2$ at the receiver 106.

One conventional approach to dealing with local oscillator phase noise in MIMO communication systems has been the use of a shared local oscillator signal at the transmitter and/or at the receiver. However, in many wireless communication systems, such an approach is not practical. For example, in wireless backhaul systems using MIMO communication, often a local oscillator signal cannot be shared by all transmitters and/or receivers because the antennas need to be placed relatively far apart (e.g., up to several meters apart) to ensure low signal path correlation. With relatively large distances separating the antennas, high frequency local oscillator signals, such as those used in microwave and millimeter-wave backhaul links, cannot be practicably shared.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
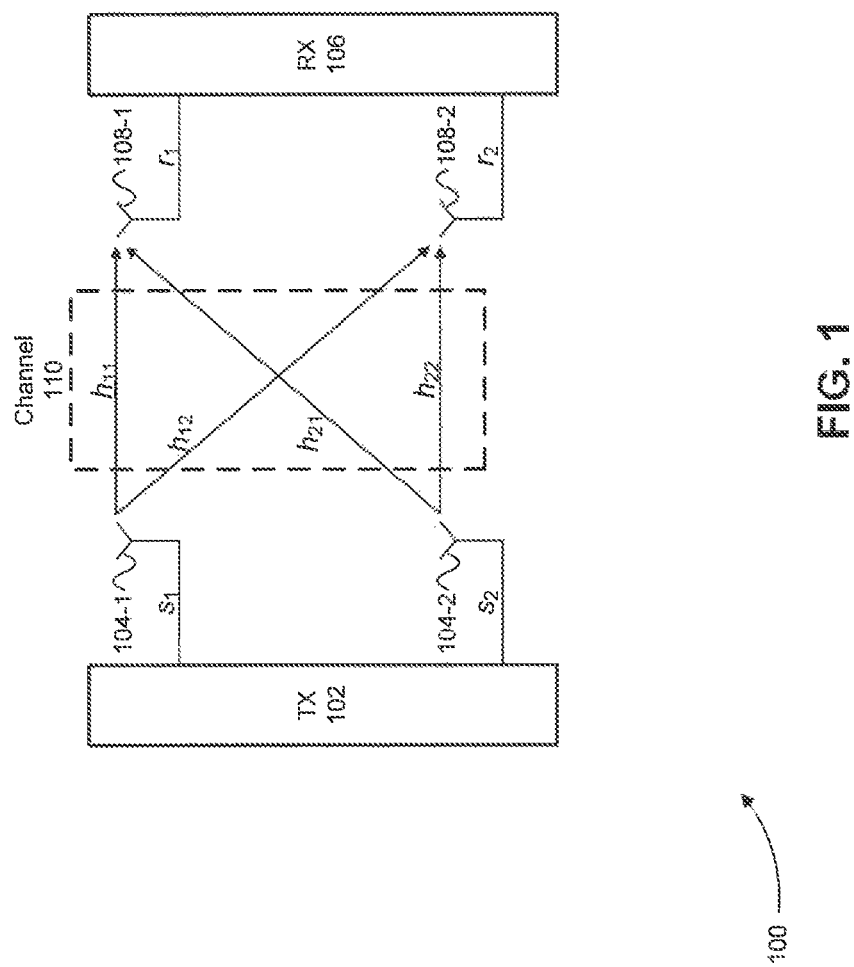
FIG. 1 illustrates a wireless communication system in accordance with embodiments of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

The present disclosure is directed to a system and method for estimating a phase offset in a MIMO communication device, and compensating for the estimated phase offset to better perform MIMO communication. The MIMO communication device is configured to exchange data with another MIMO communication device over a forward and reverse channel using at least two transceivers. The at least two transceivers each include a respective transmitter for transmitting signals over one of the two channels, and a respective receiver for receiving signals over the other one of the two channels. The at least two transceivers each use a different local oscillator that is shared between its respective transmitter and receiver for performing frequency up-conversion of signals to be transmitted and frequency down-conversion of signals received. Because different local oscillators having different random phase noise are used by the at least two transceivers, an undesired phase offset between signals up-converted and transmitted by their respective transmitters occurs.

The system and method of the present disclosure exploit the fact that the undesired phase offset between signals up-converted and transmitted by the transmitters of the at least two transceivers is correlative with a phase offset between signals received and down-converted by the receivers of the at least two transceivers. Such correlation occurs because the transmitter and receiver in each of the at least two transceivers share the same local oscillator and thus experience the same or very similar random phase noise. Using this fact, the system and method of the present disclosure are configured to measure the phase offset between signals received and down-converted by the receivers of the at least two transceivers and then use the measured phase offset to compensate for the phase offset between the signals up-converted by the transmitters of the at least two transceivers. This compensation allows MIMO communication, such as spatial multiplexing, to be better performed.

2. MIMO COMMUNICATION DEVICE

Figure 2:
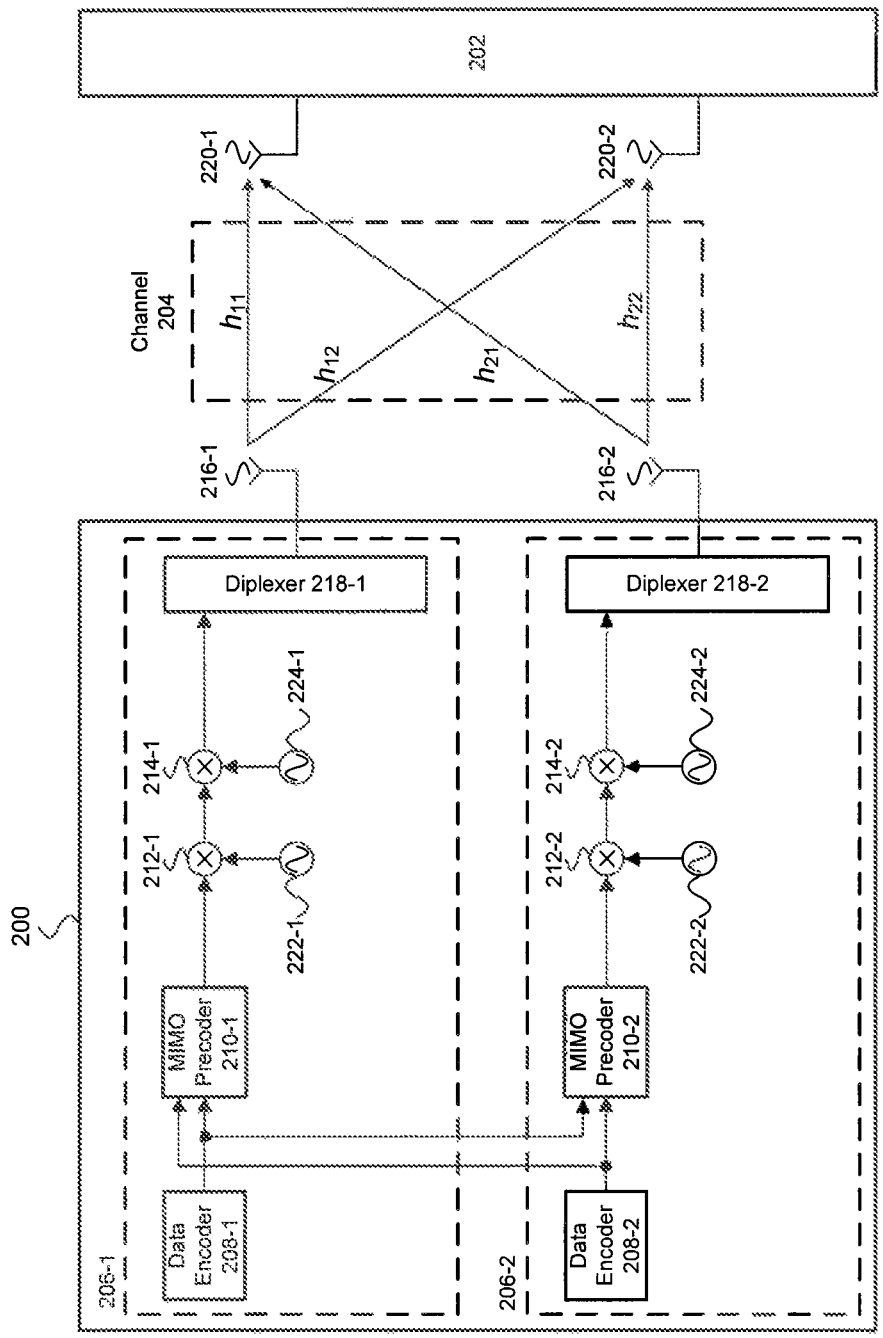
FIG. 2 illustrates a block diagram of an example MIMO communication device in accordance with embodiments of the present disclosure.

Referring now to FIG. 2, a block diagram of an example MIMO communication device 200 in accordance with embodiments of the present disclosure is illustrated. The MIMO communication device 200 wirelessly communicates with another MIMO communication device 202 over a channel 204. The MIMO communication device 200 can operate, for example, within a wireless backhaul communication system to exchange data with the MIMO communication device 202 using frequencies in the microwave or millimeter-wave range.

As shown in FIG. 2, the MIMO communication device 200 specifically includes two transceivers 206-1 and 206-2 for transmitting and receiving data. The receiver portions of the transceivers 206-1 and 206-2 are not shown. The transmitter portion of the transceiver 206-1 is coupled to an antenna 216-1 through a diplexer 218-1 and includes a data encoder 208-1, a MIMO precoder 210-1, and two up-conversion mixers 212-1 and 214-1. The transmitter portion of the transceiver 206-2 is coupled to an antenna 216-2 through a diplexer 218-2 and similarly includes a data encoder 208-2, a MIMO precoder 210-2, and two up-conversion mixers 212-2 and 214-2.

In operation, the data encoders 208-1 and 208-2 receive independent streams of data (not shown) and map groups of bits from these streams to a series of complex symbols. Prior to mapping the groups of bits to the complex symbols, the data encoders 208-1 and 208-2 may scramble the bits and/or encode the bits using a forward error correction code, such as a Reed Solomon code, a low-density parity check code, a turbo code, or a combination of these codes. Once the bits have been encoded, the data encoders 208-1 and 208-2 provide their respective series of complex symbols to both of the MIMO precoders 210-1 and 210-2.

In one embodiment, the MIMO precoders 210-1 and 210-2 implement spatial multiplexing to simultaneously transmit the two independent data streams respectively encoded by data encoders 208-1 and 208-2 over the channel 204 to the MIMO communication device 202. Spatial multiplexing exploits the spatial separation between the antennas at both the MIMO communication device 200 and the MIMO communication device 202. Because of the spatial separation (and for other reasons), a signal transmitted from either one of the antennas 216-1 and 216-2 will arrive at the antennas 220-1 and 220-2 with different phase shifts. These different phase shifts can be respectively represented by the channel elements $h_{11}$, $h_{12}$, $h_{21}$, and $h_{22}$ as shown in FIG. 2, or by the channel matrix H given by:

$$H = \begin{pmatrix} h_{11} & h_{21} \\ h_{12} & h_{22} \end{pmatrix} \quad (4)$$

Assuming knowledge of the channel matrix H is available at the MIMO communication device 200, the precoders 210-1 and 210-2 can effectively "orthogonalize" parallel transmissions from antennas 216-1 and 216-2. For example, the channel matrix H (or some estimate of the channel matrix H) can first be expressed as its singular-value decomposition (SVD):

$$H = U \cdot \Sigma \cdot V^* \quad (5)$$

where U is an $N_{RX}$ by $N_{TX}$ unitary matrix, $\Sigma$ is an $N_{TX}$ by $N_{TX}$ diagonal matrix, V is an $N_{TX}$ by $N_{TX}$ unitary matrix, and $N_{RX}$ and $N_{TX}$ respectively represent the number of antennas used at the receiver and transmitter (in this example $N_{RX}N_{TX}=2$). After expressing the channel matrix H as its SVD, the matrix V can be applied by the precoders 210-1 and 210-2 to the two independent data streams respectively encoded by data encoders 208-1 and 208-2, and $U^*$ can be applied at the receiver, leaving an equivalent channel matrix equal to the matrix $\Sigma$. Because the matrix $\Sigma$ is diagonal, the signals transmitted in parallel by the antennas 216-1 and 216-2 are effectively "orthogonalized" and can, in theory, be recovered at the receiver without interference from one another.

It should be noted that other precoding schemes, besides precoding schemes based on SVD, can be used without departing from the scope and spirit of the present disclosure. For example, lower-upper decomposition precoding schemes or geometric mean decomposition precoding schemes can be used.

In general, accurate knowledge of the channel matrix H is essential to reducing residual interference between the respective signals transmitted in parallel by the antennas 216-1 and 216-2 over the channel 204 using any method of spatial multiplexing. However, even with perfect knowledge of the channel matrix H, inherent sources of phase noise present in the transmitter portions of the transceivers 206-1 and 206-2 can result in residual interference between the signals at the receiving MIMO communication device 202. In particular, the local oscillator signals (provided by the local oscillators 222-1, 222-2, 224-1, and 224-2) used to up-convert the respective signals transmitted by the antennas 216-1 and 216-2 have inherent phase noise. The spectrum of an ideal local oscillator signal assumes the shape of an impulse. In practice, however, phase noise is seen in the spectrum of local oscillator signals as random fluctuations or "skirting" around the impulse. If not accounted for, this phase noise can corrupt the resulting up-converted signals and result in residual interference between the signals at the receiving MIMO communication device 202.

As shown in FIG. 2, the first mixer 212-1 of the transceiver 206-1 is specifically configured to frequency up-convert the precoded signal provided by the MIMO precoder 210-1 to an intermediate frequency (IF) by mixing it with a local oscillator signal provided by the local oscillator 222-1. In one embodiment, the frequency of the local oscillator signal provided by the local oscillator 222-1 can be adjusted over some range to position the precoded signal at a desired IF. After the precoded signal has been frequency up-converted to the desired IF, the second mixer 214-1 mixes the IF signal with a local oscillator signal provided by the local oscillator 224-1 to frequency up-convert the IF signal to a higher frequency for transmission over the channel 204. In one embodiment, the frequency of the local oscillator signal provided by the local oscillator 222-1 is much lower than the frequency of the local oscillator signal provided by the local oscillator 224-1. For example, in the embodiment where the MIMO communication device 200 is used in a wireless backhaul communication system and transmits signals over frequencies in the millimeter-wave range, the local oscillator signal provided by the local oscillator 222-1 may have a frequency within or around 1-2 GHz, while the local oscillator signal provided by the local oscillator 224-1 may have a frequency between 30-300 GHz.

In general, the inherent phase noise of a relatively low frequency local oscillator signal, such as that produced by the local oscillator 222-1, can be reduced to (or maintained at) a negligible amount for performing MIMO communication using known, low cost techniques. However, the inherent phase noise of a comparatively higher frequency local oscillator signal, such as that produced by the local oscillator 224-1, cannot be so easily reduced to (or maintained at) an acceptable level for performing MIMO communication, such as spatial multiplexing. One conventional approach to dealing with the inherent phase noise of the local oscillator signal provided by the local oscillator 224-1 has been to share the local oscillator signal with the other transceiver 206-2, which has two mixers 212-1 and 214-1 and two local-oscillators 222-2 and 224-2 that operate in a similar manner as those of transceiver 206-1 described above. In other words, both of the mixers 214-1 and 214-2 would receive and use the same local oscillator signal from one local oscillator, such as local oscillator 224-1. So long as the phase noise is common to both transceivers by virtue of them sharing a local oscillator, it can be shown that the inherent phase noise of the shared local oscillator has little or no impact on the performance of MIMO communication. It is generally only when there exists a phase noise difference between the transmitters of the transceivers 206-1 and 206-2 that the performance of MIMO communication degrades.

However, in many wireless communication systems, such an approach to solving the phase noise issue is not practical. For example, in wireless backhaul systems, often a local oscillator signal cannot be shared between the transceivers of a MIMO communication device because their respective antennas need to be placed relatively far apart (e.g., up to several meters apart) to ensure low signal path correlation. With relatively large distances separating the antennas, high frequency local oscillator signals, such as those used in microwave and millimeter-wave backhaul links, cannot be practicably shared. Described further below in regard to FIG. 3, are a system and method that provide one solution to estimate and compensate for this difference in phase noise between the transmitters of the transceivers 206-1 and 206-2 due to the local oscillators 224-1 and 224-2.

3. MIMO COMMUNICATION DEVICE WITH PHASE NOISE ESTIMATION AND COMPENSATION

Figure 3:
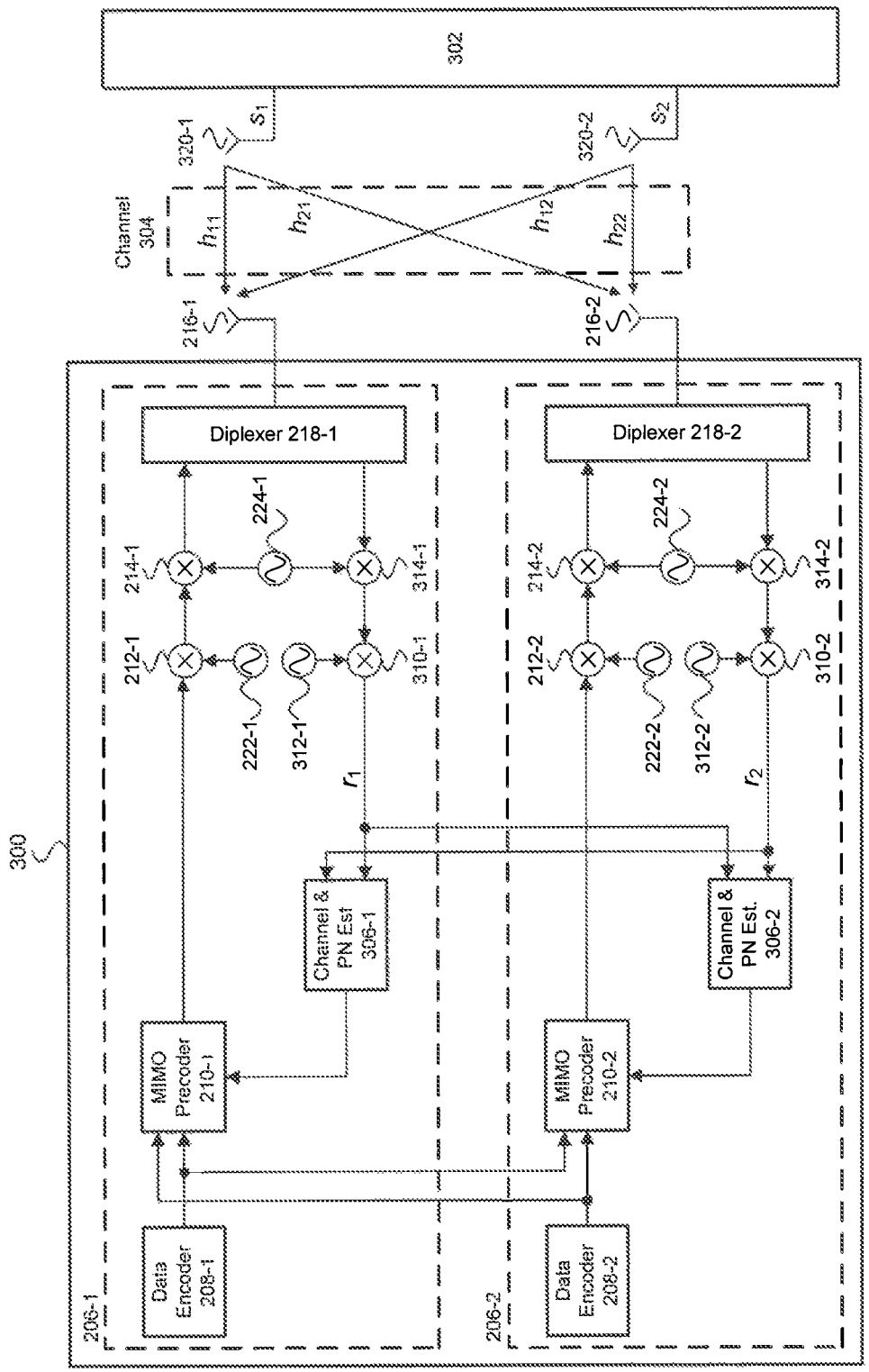
FIG. 3 illustrates a block diagram of an example MIMO communication device with phase noise offset estimation and compensation in accordance with embodiments of the present disclosure.

FIG. 3 illustrates a block diagram of an example MIMO communication device 300 in accordance with embodiments of the present disclosure. The MIMO communication device 300 wirelessly communicates with another MIMO communication device 302 over a channel 304. The MIMO communication device 300 can operate, for example, within a wireless backhaul communication system (e.g., as part of a base station) to exchange data with the MIMO communication device 302 using frequencies in the microwave or millimeter-wave range.

As illustrated in FIG. 3, the MIMO communication device 300 comprises a substantially similar structure as the MIMO communication device 200 described above in FIG. 2, but further comprises additional components for estimating a difference in phase noise between the transmitters of the transceivers 206-1 and 206-2 and compensating for the difference in phase noise. Specifically, the transceiver 206-1 further comprises a channel and phase noise estimator 306-1, a first down-conversion mixer 310-1 coupled to a local oscillator 312-1, and a second down-conversion mixer 314-1 coupled to the same local oscillator 224-1 as the up-conversion mixer 214-1 used by the transmitter portion of the transceiver 206-1. The transceiver 206-2 similarly further comprises a channel and phase noise estimator 306-2, a first down-conversion mixer 310-2 coupled to a local oscillator 312-2, and a second down-conversion mixer 314-2 coupled to the same local oscillator 224-2 as the up-conversion mixer 214-2 used by the transmitter portion of the transceiver 206-2. In one embodiment, the two additional down-conversion mixers 310-1 and 314-1 in the transceiver 206-1 form part of a receiver chain (not fully shown) of the transceiver 206-1, and the two additional down-conversion mixers 310-2 and 314-2 in the transceiver 206-2 further form part of a receiver chain (not fully shown) of the transceiver 206-2.

In operation, the channel and phase noise estimators 306-1 and 306-2 are configured to exploit the fact that the difference in phase noise between the signals up-converted and transmitted by the transmitter portions of the transceivers 206-1 and 206-2 is correlative with a difference in phase noise between signals received and down-converted by the down-conversion mixers 314-1 and 314-2. Such correlation occurs because the up-conversion mixer 214-1 shares the same local oscillator 224-1 with the down-conversion mixer 314-1, and because the up-conversion mixer 214-2 shares the same local oscillator 224-2 with the down-conversion mixer 314-2. Using this fact, the channel and phase noise estimators 306-1 and 306-2 are configured to measure the difference in phase noise between signals received and down-converted by the down-conversion mixers 314-1 and 314-2 and then use the measured difference in phase noise to compensate for the difference in phase noise between the signals up-converted by the transmitter portions of the transceivers 206-1 and 206-2. This compensation allows MIMO) communication, such as spatial multiplexing, to be better performed.

Before the difference in phase noise can be estimated in such a manner, the channel 304 needs to be estimated. In one embodiment, the MIMO communication device 302 can transmit known pilot symbols from its antennas 320-1 and 320-2 to the MIMO communication device 300 to aid in the estimation of the channel 304. The known pilot symbols are received by the antennas 216-1 and 216-2 of the MIMO communication device 300 and are provided to the series of down-conversion mixers 310-1 and 314-1 in the transceiver 206-1 by the diplexer 218-1 and to the series of down-conversion mixers 310-2 and 314-2 in the transceiver 206-2 by the diplexer 218-2. The channel and phase noise estimators 306-1 and 306-2 can use the down-converted, known pilot symbols to estimate the channel 304 using known channel estimation techniques. In another embodiment, the channel and phase noise estimators 306-1 and 306-2 can perform channel estimation using symbols received from the MIMO communication device 302 that are not known ahead of time. For example, the channel and phase noise estimators 306-1 and 306-2 can be adaptive equalizers that use a blind channel estimation method to estimate the channel 304. In yet another embodiment, the channel and phase noise estimators 306-1 and 306-2 can receive an estimate of the channel from the MEMO communication device 302 rather than actually perform channel estimation. Such an implementation can be used where the channel from device 300 to device 302 is substantially identical to the channel from device 302 to device 300.

Once the channel 304 and its respective elements $h_{11}$, $h_{12}$, $h_{21}$, and $h_{22}$ have been estimated and symbols can be decoded by the MIMO communication device 300, the MIMO communication device 300 can estimate the difference in phase noise between signals received and down-converted by the down-conversion mixers 314-1 and 314-2. The MIMO communication device 302 can transmit known pilot symbols in parallel from its antennas 320-1 and 320-2 to the MIMO communication device 300 to aid in the estimation of the difference in phase noise between signals received and down-converted by the down-conversion mixers 314-1 and 314-2. Pilot symbols can be located among data symbols so that overhead of the pilot symbols is very low.

For example, as shown in FIG. 3, the MIMO communication device 302 can transmit symbols $s_1$ and $s_2$, which can be either known pilot symbols or data symbols, in parallel from its antennas 320-1 and 320-2 over the channel 304 to the MIMO communication device 300. The resulting received and down-converted vectors $r_1$ and $r_2$ are approximately given by:

$$\begin{bmatrix} r_1 \\ r_2 \end{bmatrix} = \begin{bmatrix} e^{j\phi_3} & 0 \\ 0 & e^{j\phi_4} \end{bmatrix} \begin{bmatrix} h_{11} & h_{21} \\ h_{12} & h_{22} \end{bmatrix} \begin{bmatrix} e^{j\phi_1} & 0 \\ 0 & e^{j\phi_2} \end{bmatrix} \begin{bmatrix} s_1 \\ s_2 \end{bmatrix} \quad (6)$$

where $e^{j\phi_1}$ and $e^{j\phi_2}$ are the phase (including the phase noise) respectively introduced by the transmitters (not shown) of the MIMO communication device 302 that sent symbols $s_1$ and $s_2$, and $e^{j\phi_3}$ and $e^{j\phi_4}$ are the phase (including the phase noise) respectively introduced by the local oscillators 224-1 and 224-2 during down-conversion of the symbols $s_1$ and $s_2$. The respective matrices on the right side of the equals sign can be multiplied out and rewritten as follows:

$$\begin{bmatrix} r_1 \\ r_2 \end{bmatrix} = \begin{bmatrix} e^{j\phi_3}(e^{j\phi_1} h_{11} s_1 + e^{j\phi_2} h_{12} s_2) \\ e^{j\phi_4}(e^{j\phi_1} h_{21} s_1 + e^{j\phi_2} h_{22} s_2) \end{bmatrix} \quad (7)$$

The channel and phase noise estimators 306-1 and 306-2 respectively receive both $r_1$ and $r_2$ and process these values to determine the difference in phase noise between them due to the local oscillators 224-1 and 224-2 respectively coupled to the down-conversion mixers 314-1 and 314-2, which is given by $|e^{j\phi_3} - e^{j\phi_4}|$. For example, and in one embodiment, the channel and phase noise estimators 306-1 and 306-2 conjugate multiply $r_1$ and $r_2$ resulting in:

$$= e^{j\phi_3}(e^{j\phi_1} h_{11} s_1 + e^{j\phi_2} h_{12} s_2)\overline{e^{j\phi_4}(e^{j\phi_1} h_{21} s_1 + e^{j\phi_2} h_{22} s_2)} = \quad (8)$$
$$e^{j(\phi_3 - \phi_4)}(h_{11} s_1 \overline{h_{21} s_2} + e^{j(\phi_1 - \phi_2)} h_{11} s_1 \overline{h_{22} s_2} +$$
$$e^{j(\phi_2 - \phi_1)} h_{12} s_2 \overline{h_{21} s_1} + h_{12} s_2 \overline{h_{22} s_2})$$

Because $s_1$ and $s_2$ are independent and identically distributed random values (due to how they are processed by the transmitters of the MIMO communication device 302), it can be shown that the expectation of $(s_1 \overline{s_1})$ and $(s_2 \overline{s_2})$ are both given by $E\{|s_1|^2\} = E\{|s_2|^2\} = E\{|s|^2\}$, and that the expectation of $(s_1$ $\overline{s_2}$) and ($s_2 \overline{s_1}$) are both equal to zero. Thus, equation (8) can be simplified and rewritten as:

$$= E\{|s|^2\} e^{j(\Theta_3 - \Theta_4)} (h_{11}\overline{h_{21}} + h_{12}\overline{h_{22}}) \quad (9)$$

Because the channel elements $h_{11}$, $h_{12}$, $h_{21}$, and $h_{22}$ and symbols $s_1$ and $s_2$ are known, the channel and phase noise estimators 306-1 and 306-2 can solve for $|e^{j\Theta_3} - e^{j\Theta_4}|$, which is substantially equal to the difference in phase noise between $r_1$ and $r_2$ due to the local oscillators 224-1 and 224-2 respectively coupled to the down-conversion mixers 314-1 and 314-2. As would be appreciated by one of ordinary skill in the art based on the disclosure herein, this determined difference can then be provided to the MIMO precoders 210-1 and 210-2 by the channel and phase noise estimators 306-1 and 306-2 to compensate for the difference in phase noise between the signals up-converted by the transmitter portions of the transceivers 206-1 and 206-2. More specifically, the complex symbols provided by the data encoders 208-1 and 208-2 can be further weighted or precoded by the determined difference in phase noise to compensate for the offset.

It should be noted that, although the system and method for phase noise estimation and compensation was described above with respect to the two MIMO communications devices 300 and 302 that each have two transceivers, the system and method can be generalized, as would be appreciated by one of ordinary skill in the art, to work with two MIMO communication devices having any practical number of transceivers (e.g., three, four, or even ten transceivers).

4. CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A communication device comprising:
   a first receiver configured to down-convert a first received signal using a first local oscillator signal to provide a first down-converted signal;
   a second receiver configured to down-convert a second received signal using a second local oscillator signal to provide a second down-converted signal; and
   a phase noise estimator configured to estimate a difference in phase noise between the first and second local oscillator signals based on the first and second down-converted signals and an estimate of a receive channel over which the first and second received signals are received, wherein the communication device is configured to use the estimated difference in phase noise to compensate for a phase offset between signals to be transmitted from the communication device.

2. The communication device of claim 1, further comprising:
   a first precoder configured to precode a first symbol and a second symbol based on the estimated difference in phase noise between the first and second local oscillator signals to provide a first precoded signal; and
   a second precoder configured to precode the first symbol and the second symbol based on the estimated difference in phase noise between the first and second local oscillator signals to provide a second precoded signal.

3. The communication device of claim 2, wherein the first precoded signal is up-converted using the first local oscillator signal for transmission over a transmit channel, and the second precoded signal is up-converted using the second local oscillator signal for transmission over the transmit channel.

4. The communication device of claim 3, wherein, before the first precoded signal is up-converted using the first local oscillator signal, the first precoded signal is up-converted to an intermediate frequency using a third local oscillator signal not used to down-convert the first-received signal.

5. The communication device of claim 3, wherein both the first and second precoders are further configured to precode the first and second symbols using a portion of a singular value decomposition of the transmit channel.

6. The communication device of claim 3, wherein the transmit channel is a microwave or millimeter-wave wireless backhaul link.

7. The communication device of claim 6, wherein the communication device is implemented in a base station.

8. The communication device of claim 2, further comprising:
   a first transmitter configured to up-convert the first precoded signal using the first local oscillator signal for transmission over a transmit channel; and
   a second transmitter configured to up-convert the second precoded signal using the second local oscillator for transmission over the transmit channel.

9. The communication device of claim 2, wherein the first and second precoders are further configured to precode the first and second symbols to perform spatial multiplexing.

10. The communication device of claim 1, wherein the receive channel is a wireless channel and the estimate of the receive channel includes four phase shifts corresponding to four different signal paths of the receive channel.

11. The communication device of claim 1, wherein the first received signal corresponds to a combination of two symbols as received by a receive antenna of the first receiver.

12. The communication device of claim 11, wherein each of the two symbols is transmitted by a respective transmit antenna.

13. The communication device of claim 12, wherein the second received signal corresponds to a combination of the two symbols as received by a receive antenna of the second receiver.

14. A communication device for estimating and compensating for phase noise, the communication device comprising:
   a phase noise estimator configured to estimate a difference in phase noise between a first local oscillator signal and a second local oscillator signal based on: a first received signal down-converted by the first local oscillator signal, a second received signal down-converted by the second local oscillator signal, and an estimate of a receive channel over which the first and second received signals are received;
   a first precoder configured to precode a first symbol and a second symbol based on the estimated difference in phase noise between the first and second local oscillator signals to provide a first precoded signal; and
   a second precoder configured to precode the first symbol and the second symbol based on the estimated difference in phase noise between the first and second local oscillator signals to provide a second precoded signal.

15. The communication device of claim 14, wherein the first precoded signal is up-converted using the first local oscillator signal for transmission over a transmit channel, and the second precoded signal is up-converted using the second local oscillator signal for transmission over the transmit channel.

16. The communication device of claim 15, wherein the first and second precoders are further configured to precode the first and second symbols using a portion of a singular value decomposition of the transmit channel.

17. The communication device of claim 16, wherein the transmit channel is a microwave or millimeter-wave wireless backhaul link.

18. The communication device of claim 17, wherein the communication device is implemented in a base station.

19. The communication device of claim 14, wherein the first and second precoders are further configured to precode the first and second symbols to perform spatial multiplexing.

20. A method for estimating phase noise, the method comprising:
  down-converting a first received signal using a first local oscillator signal to provide a first down-converted signal;
  down-converting a second received signal using a second local oscillator signal to provide a second down-converted signal; and
  estimating a difference in phase noise between the first and second local oscillator signals based on the first and second down-converted signals and an estimate of a receive channel over which the first and second received signals are received,
  wherein the estimated difference in phase noise is used to compensate for a phase offset between signals to be transmitted.

21. The method of claim 20, further comprising:
  precoding a first symbol and a second symbol based on the estimated difference in phase noise between the first and second local oscillator signals to provide a first precoded signal; and
  precoding the first symbol and the second symbol based on the estimated difference in phase noise between the first and second local oscillator signals to provide a second precoded signal.

22. The method of claim 21, further comprising:
  up-converting the first precoded signal using the first local oscillator signal for transmission over a transmit channel; and
  up-converting the second precoded signal using the second local oscillator signal for transmission over the transmit channel.

23. The method of claim 22, wherein the first and second symbols are precoded using a portion of a singular value decomposition of the transmit channel.

24. The method of claim 22, wherein the transmit channel is a wireless backhaul link.

* * * * *